United States Patent [19]

Green

[11] 4,199,055
[45] Apr. 22, 1980

[54] SHUFFLE FEEDER INTERLOCKING FLIGHTS

[75] Inventor: Chester Green, San Jose, Calif.

[73] Assignees: Genevieve I. Hanscom; Robert M. Magnuson; Lois J. Thomson, trustees of the estate of Roy M. Magnuson, all of San Jose, Calif.; a part interest to each

[21] Appl. No.: 893,088

[22] Filed: Apr. 3, 1978

[51] Int. Cl.² ............................................. B65G 25/04
[52] U.S. Cl. ..................................................... 198/773
[58] Field of Search ................ 198/773, 774, 775, 777

[56] References Cited

U.S. PATENT DOCUMENTS

| | | | |
|---|---|---|---|
| 1,992,331 | 2/1935 | Smith | 198/773 X |
| 2,792,929 | 5/1957 | Magnuson et al. | 198/773 |
| 3,151,729 | 10/1964 | Gardiner | 198/773 X |
| 3,509,988 | 5/1970 | Smith | 198/773 |

*Primary Examiner*—James L. Rowland
*Attorney, Agent, or Firm*—Gerald L. Moore

[57] ABSTRACT

A shuffle feed structure comprising first and second sets of shuffle feed members supported on their respective frames for reciprocating movement so as to advance articles lying thereon in single file order. The feed members are constructed with adjacent surfaces including offset portions so as to prevent articles being advanced from aligning with and falling through the space between the individual flights.

3 Claims, 9 Drawing Figures

SHUFFLE FEEDER INTERLOCKING FLIGHTS

BACKGROUND OF THE INVENTION

Shuffle feed apparatus utilize parallel-positioned feed members which are reciprocated back and forth in opposite directions in a wave action to move articles in single file order along their leading edges. For the most part such feed mechanisms are used in the handling of small items, such as fruits and vegetable food products to control the feed rate to a processing station. Because of their use in the food processing industry, it is important that such apparatus be readily cleanable. in addition, it is important that the apparatus operate in a manner to prevent, to the degree possible, the access of the product between flights because of the loss of the product as well as the contamination of the apparatus.

When the articles being handled do fall between the individual flights, jamming and malfunction of the apparatus can result. Such is particularly true in the handling of solid articles such as nuts and bolts or the like made of metal. As a result the flights must be precision manufactured so as to move along paths spaced closely together which can increase substantially the cost of manufacture of the apparatus. In addition the closely positioned parts can cause greater friction and require more power to operate than other apparatus.

The primary purpose of this invention is to provide a shuffle feed mechanism of relatively simple design which will handle articles having a small diameter and in particular, elongated articles having a small diameter.

CROSS-REFERENCE TO RELATED PATENTS

Application for United States Patent, Ser. No. 777,559, Shuffle Feed Structure, Chester Green, Filed Mar. 14, 1977, now abandoned.

SUMMARY OF THE INVENTION

A shuffle feed apparatus having two sets of shuffle feed members supported by corresponding frame members for reciprocal movement to move articles in single-file order along their leading edges. The adjacent flights include overlapping portions so as to present overlapping leading edges to prevent alignment of articles on the front faces thereof with the space between flights.

DESCRIPTION OF THE INVENTION

Figure 1:
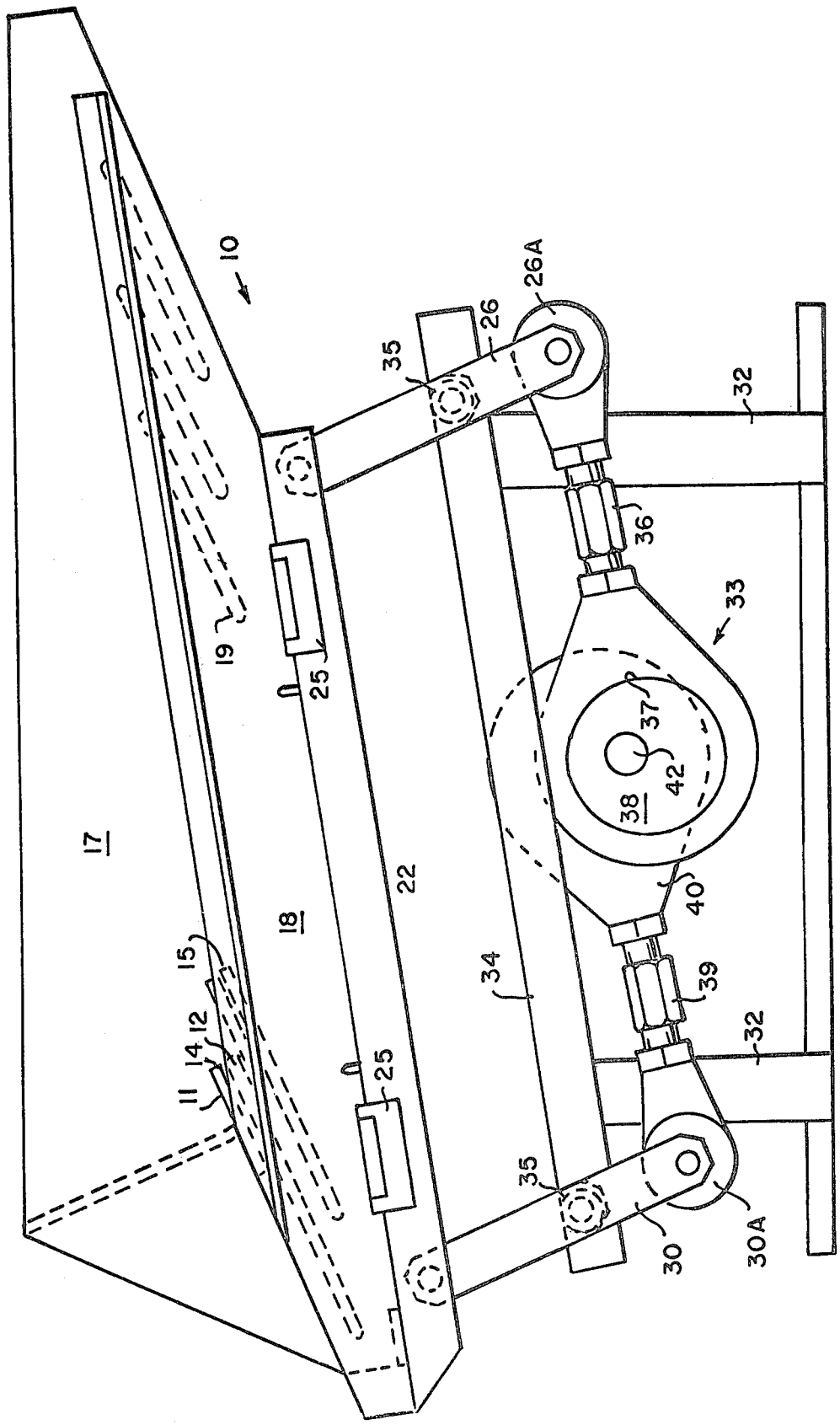
FIG. 1 shows a shuffle feed mechanism of the type in which the subject invention can be incorporated.
Figure 2:
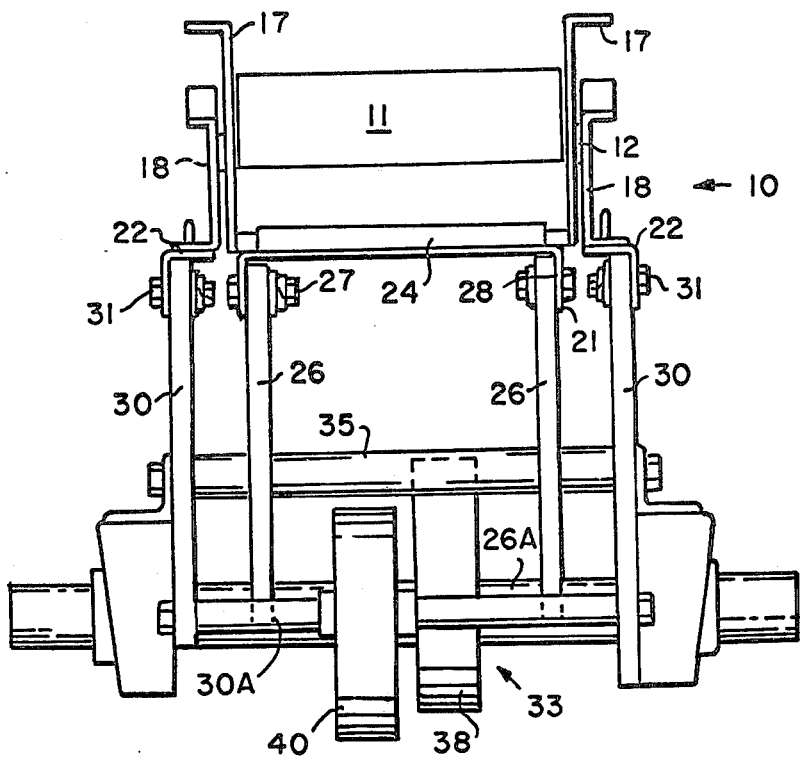
FIG. 2 is an end view of the apparatus of FIG. 1.

The invention is embodied in a shuffle feed apparatus such as that shown in FIGS. 1 and 2 comprising a shuffle feed bed 10 having similar movable sets of independently supported and alternately arranged shuffle members 11 and 12. These members usually are fabricated from sheet metal or from a molded material and are mounted in an inclined position each having upwardly facing article-supporting faces 14 and 15, respectively. By reciprocatory movement of the sets of members relative to each other and along parallel paths, articles 16 (FIGS. 5A and 5B) can be moved forward in single-file order. The overall object of a shuffle feeder is to move the articles aligning with the front faces of the shuffle members forward while permitting the articles not aligning with each front face, i.e. piled on top, to slide back along the side of the advancing shuffle feed member so as not to be progressed forward. By the time articles reach the end of the shuffle apparatus, they are being advanced along lines by the valley-to-valley wave action of the shuffle apparatus at a controlled feed rate.

Figure 5A:
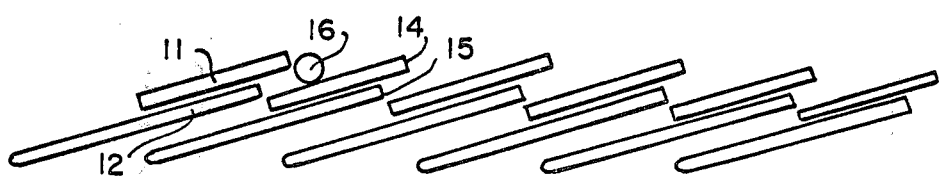
FIGS. 5A and 5B are side views of the flights in the various positions for advancing articles along the leading edges thereof.
Figure 5B:
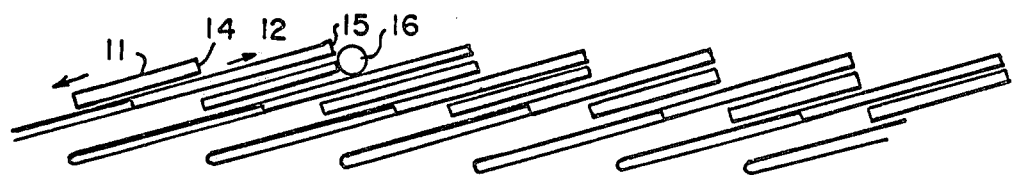

As shown in FIGS. 5A and 5B, the shuffle members 11 and 12 are reciprocated along paths parallel to each other so the article is alternately pushed up the side of the next shuffle feed member by the face of the last and adjacent shuffle feed member. The sizes of the faces of the shuffle feed members and at times the shapes of the faces are adapted to accommodate different configurations of articles to be fed. The different flights of shuffle feed members 11 and 12 are fixed to pairs of parallel-positioned side frame members 17 and 18, respectively. The side frame members 17 are parallel-positioned and inside the parallel-positioned side frame members 18 as shown primarily in FIG. 2. The shuffle feed members preferably are welded to the respective side frame members and positioned in spaced parallel relationship in an inclined position so that the trailing feed member will advance an article up the side of the next feed member and allow it to drop down in front of the front edge of that next member.

Figure 4:
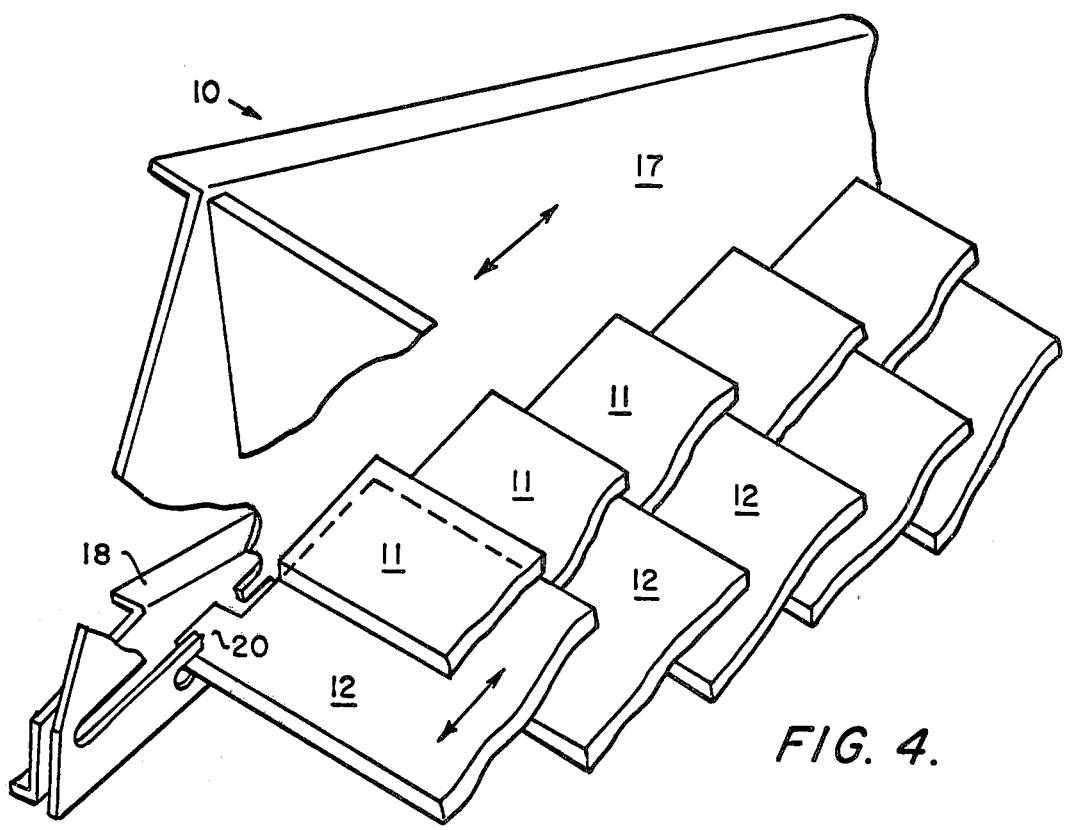
FIG. 4 is an enlarged partial view in perspective of the shuffle feed flights of FIG. 1.

Each frame member 17 includes a plurality of slots (FIG. 4) aligned with the space between and extending in a direction parallel to the flat sides of the attached shuffle members 11. Each shuffle member 12 includes an end-mounted extension 20 sized to fit through the slot 19 in the adjacent side frame member 17 for attachment to the frame member 18. The shuffle members thus are interspersed between each adjacent pair of shuffle members and can be shifted within the slots 19 to provide the shuffle feed action. As a result a compact structure wherein the side frame members are positioned adjacent to one another in side-by-side relationship is provided.

Figure 3:
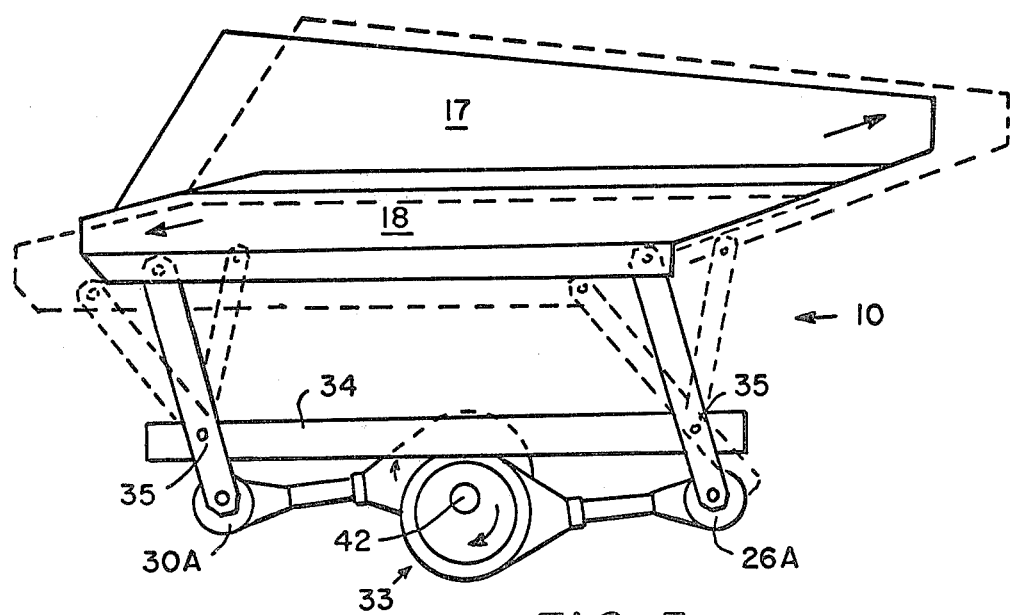
FIG. 3 shows the various positions of the frame members in reduced size during operation of the shuffle feed apparatus.

The shuffle feed bed 10 is supported on a support and drive apparatus in a manner to be easily removed for cleaning and interchanging. As shown primarily in FIGS. 1, 2 and 3, there is positioned beneath the shuffle feed bed a center support 21 and a pair of side rails 22 for attachment to the side frame members 17 and 18, respectively. The center support 21 is fixed to the cross support 24 connecting the spaced side frame members 17 in a suitable manner such as by bolting. Similarly the side supports 22 are fixed to the side frame members 18 by a suitable manner such as by the fasteners 25 shown in FIG. 1.

For support and movement of the shuffle feed members back and forth, the center support 21 and side supports 22 are mounted respectively on upright posts which are pivoted back and forth by a suitable drive means. For instance, the center support 21 is fixed to the ends of the parallel-positioned and spaced uprights 26 by bolts 27 passing through the upper ends of the upright supports and the flanges 28 fixed to the center support. Also, the flanges 22 are supported on four uprights 30 by bolts 31 passing through flanges on the supports 22.

The apparatus is supported on the upright legs 32 supporting a pair of parallel-spaced intermediate beams 34. Extending between these beams are a pair of shafts 35 positioned to pass through aligned openings in the adjacent uprights 26 and 30 at each end of the apparatus. The shafts pass through the uprights at an intermediate position such that pivoting of the uprights about the shafts will cause a reciprocatory motion of the supported side frame members and the attached flight members.

The lower ends of the uprights are oscillated back and forth by an eccentric drive apparatus 33. Connected to a shaft 26A extending between one pair of the uprights 26 is a drive link 36 riding on one land 37 of an eccentric 38. Similarly a drive link 39 is pivotally attached to a shaft 30A connecting lower ends of the pair of uprights 30 is driven by a land of an eccentric 40. The lands are driven by a shaft 42 which is power driven by a suitable means (not shown) such that by rotation of the eccentrics 38 and 40 the uprights 26 and 30 are reciprocated back and forth in an alternating fashion to move the shuffle flights back and forth for advancing articles resting on the front edges or faces of the flight members in the manner previously described.

Frequently, such shuffle feeders are utilized to align and singulate elongated articles such as bread sticks, carrots, spaghetti, jerky, bolts, ball point pens and the like. The reason for this widespread usage is that such articles must be aligned when packaged because they cannot be randomly placed in a container suitable for shipment or retail sale. Thus, alignment and singulating is necessary to permit the counting of the individual articles and the subsequent packaging in a parallel aligned manner.

However, such articles frequently are of small diameter even though long, making them susceptible to falling or wedging between the individual flights of a shuffle feeder. As explained before, such shuffle feed flights frequently are spaced apart slightly because of the relative motion and this spacing can be sufficient to permit small articles being handled to wedge between the flight members. It is the primary purpose of the subject invention to provide an apparatus which will feed such articles in a controlled manner and yet prevent such articles from passing between flight members.

In accordance with the present invention, the flight members are constructed with the adjacent complementary surfaces including offset portions such that the space between flights is not planar. The offset portions are spaced apart a distance less than the normal length of the articles being handled such that the articles always abut a portion of the face of the next preceding flight. In this manner the articles are prevented from passing between flights even if the diameter is sufficiently small to possibly wedge therebetween.

Figure 7:
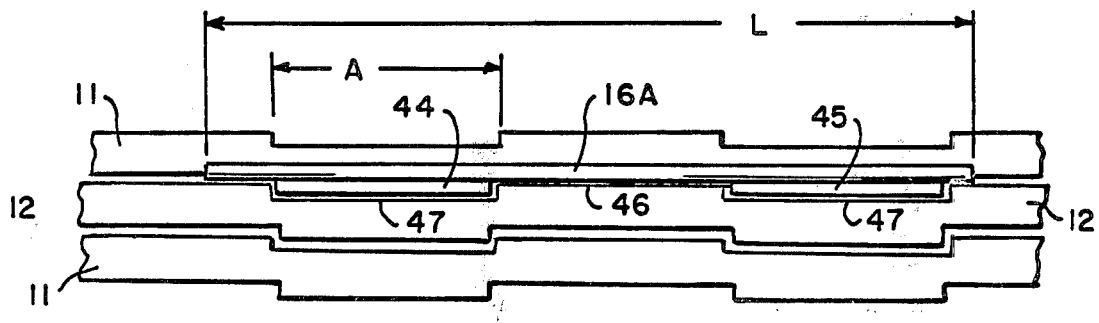
FIG. 7 is an end view of two adjacent flights incorporating the subject invention.

Accordingly, as shown primarily in FIG. 7, the flight member 11 includes offset portions 44 and included grooved areas 45 which are complementary to the offset or projecting areas 46 of flight 12 and the included grooved areas 47, respectively. These grooves and projecting areas have sides extending parallel to the direction of travel of the flight members. In this example the offset portions have sides facing normal to the direction of travel of the shuffle feed members. Thus, movement of the flight members is not encumbered as is illustrated in FIG. 8.

To explain the operation of the flight members in the advancing of articles, the articles 16 (FIG. 7) have a length L exceeding the width A of the grooves and projections. Thus, as illustrated the article 16A in being advanced will extend past one of the projections 44 as it abuts the front face of the flight 11 such that at least one end rests on the adjacent projection 46 on the top surface of the flight 12. Thus, as described there is provided a means for handling elongated articles of small diameters even though the space between flights might be close in size to the diameter of the articles. Of course it is usually advantageous to make the spacing between flights as small as possible in comparison to the diameter of the articles being handled within the limits of economical manufacture and operation of the apparatus.

Figure 6:
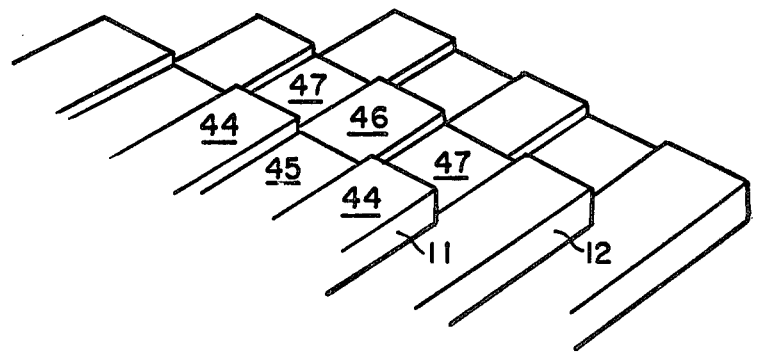
FIG. 6 is a perspective view of a portion of the flights incorporating the subject invention.
Figure 8:
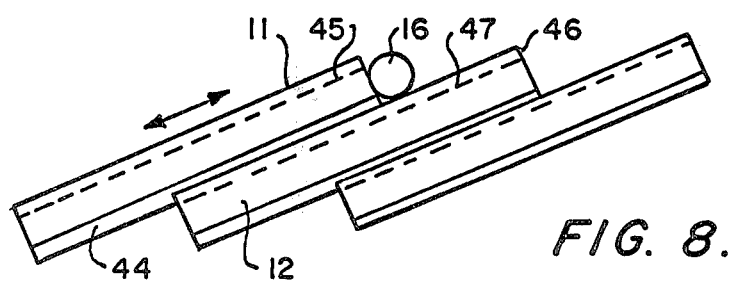
FIG. 8 is a side view showing the manner in which the adjacent flights overlap.

While a particular configuration of the flights is illustrated in FIGS. 6, 7 and 8, it should be understood that the offset portions can be any of a multitude of configurations which make the offset portions between flights closer spaced than the length of the articles being handled. In this manner the articles are kept out of alignment with the flight junctures so long as they are resting flat against the flight faces.

The invention claimed is:

1. A shuffle feed structure comprising in combination:
   a set of first shuffle feed members positioned in spaced parallel relationship;
   a set of second shuffle feed members positioned in parallel spaced relationship and positioned alternately between the first shuffle feed members;
   drive means connecting said first sets of shuffle feed members and said second sets of shuffle feed members and operable to cause alternate back and forth movement of said feed member sets so as to effect a wave action between the adjacent shuffle members sets;
   said shuffle feed members each having a front face configured to abut an article resting on the next adjacent shuffle feed member and positioned to advance the article forward as the shuffle feed member is moved by the drive means;
   said adjacent shuffle feed members having adjacent complementary planar surfaces with offset portions such that the junction therebetween is formed in a plurality of non-coinciding planes to prevent the articles from wedging between adjacent shuffle feed members.

2. A shuffle feed structure as defined in claim 1 wherein said offset portions have sides extending parallel to the direction of movement of the shuffle feed members.

3. A shuffle feed structure as defined in claim 2 wherein said offset portions have sides facing normal to the direction of travel of the shuffle feed members.

* * * * *